Patented Mar. 13, 1945

2,371,483

UNITED STATES PATENT OFFICE 2,371,483

COPPER PIGMENT

Sidney B. Tuwiner, Flushing, N. Y., and Dwight A. Dodge, Baltimore, Md., assignors to Phelps Dodge Corporation, New York, N. Y., a corporation of New York No Drawing. Application November 1, 1941, Serial No. 417,470

15 Claims. (Cl. 106—288)

This invention is concerned with the production of copper pigments and more particularly with the preparation of true green copper pigments of good intensity and stability.

Green pigment-like compounds may be prepared from copper salts of organic acids, such as succinic acid. Such compounds, however, are deficient in shade and intensity of color. For example, cupric salts of such organic acids, even when in the required physical condition for use as pigments, have low color strength and are a bluish green rather than a true green color.

It is an object of the present invention to provide an improved method for the production of pigments including organic copper compounds. It is also an object to provide a procedure for producing copper pigments of true green color and of good intensity and stability. Another object is to provide an improved copper pigment comprising a mixture of organic copper compounds and a colloidal dispersion of cuprous oxide. Other objects will become apparent.

We have found that compositions comprising organic copper compounds and containing both cuprous and cupric copper give pigments of good physical properties and chemical stability. For instance, a pigment composition containing submicrocrystalline normal copper succinate, amorphous basic copper succinate and submicrocrystalline cuprous oxide, gives a pigment of true green color and of good intensity and stability.

Such a product may be prepared, for example, by coprecipitating cupric carbonate and a cupric salt of a dibasic acid having at least two carbon atoms between the carboxyl groups and heating the precipitate. For example, a mixed salt of copper carbonate and succinate may be precipitated. The precipitate may be dried and the dried precipitate may be heated sufficiently to liberate carbon dioxide and combined water. During this treatment cuprous oxide is apparently formed by a thermal decomposition of the amorphous basic copper succinate, or from its succinate-carbonate precursor, leaving a pigment containing normal copper succinate, amorphous basic copper succinate with cuprous oxide colloidally dispersed within the basic copper succinate.

As a specific example of the production of such a pigment, 67½ grams of anhydrous sodium carbonate was added to a water solution containing 50 grams of succinic acid. After the effervescence had ceased, the solution was cooled and a saturated aqueous solution containing 158 grams of blue vitriol crystals was added, the solutions at the time of mixing being at room temperature (about 70° F.). The resulting blue green precipitate, which contained about 98% of the copper added in the form of coprecipitated cupric succinate and cupric carbonate, was air dried for 48 hours on a steam bath, where the temperature of the material reached about 140° F. The dried powder was then heated at a temperature of 470° F. in an atmosphere of nitrogen with sufficient stirring to promote even heating throughout the mass. A vivid green pigment of good color strength was obtained. The pigment gave an ultimate analysis of 48.87% cupric oxide, 7.17% cuprous oxide, the balance, 43.96%, being assumed to be a succinic anhydride.

In the process of heating at 470° F., the carbonate originally present was decomposed to liberate carbon dioxide. Water was also evolved, both from the physical and chemical combination. A partial reduction of the copper also occurred, the organic constituent of the solid probably suffering partial oxidation and thus accounting for the cuprous oxide in the final product. This product, after heating at 470° F., is stable to moisture and to the elements. It is also fairly stable to heat at temperatures below about 450° F. and is more stable to most reagents than before the heating. It has a high tinting strength and shows good durability in oil paints.

The coprecipitated blue-green combination of copper succinate and copper carbonate, the preparation of which is described in the example above, after drying at 140° F., was subjected to X-ray examination for crystal structure. The X-ray photograms obtained were practically identical with that for normal cupric succinate and did not indicate the presence of copper carbonate, but the chemical analysis showed that the precipitate contained much more cupric copper than normal cupric succinate. This would indicate that normal cupric succinate is present in the succinate-carbonate precipitate in crystalline form associated with a form of copper carbonate, or some combination of copper carbonate with copper succinate, which is amorphous, since only an amorphous material would produce no X-ray photogram lines. The dried material, after being heated to 470° F. in an atmosphere of nitrogen, again showed the identical lines of normal cupric succinate in addition to diffuse lines corresponding with those of cuprous oxide. No lines corresponding with cupric oxide were obtained, but the cupric copper was in excess of that in normal cupric succinate. Heating to 450° F. in an inert atmosphere was without effect and no reduction of the cupric compound took place on heating to 450° F. in a hydrogen atmosphere, thus showing that the cupric oxide was not present as amorphous cupric oxide.

This pigment material may be represented stoichiometrically as a combination of normal copper succinate, cupric oxide and cuprous oxide, the empirical chemical formula of which would be:

$$CuC_4H_4O_4 + 0.394 CuO + 0.114 Cu_2O$$

Inasmuch as there were no lines corresponding to cupric oxide in the photogram pattern, and no decomposition or reduction of cupric compounds took place on heating to 450° F., the cupric oxide must be present as one or more basic cupric succinates, which are amorphous. The cuprous oxide is present, mainly if not entirely, as free cuprous oxide in a highly dispersed form throughout the mass. It is converted to hydrated cuprous oxide, a bright yellow residue, when the basic and normal copper succinates are dissolved in dilute acetic acid. Upon examination of the pigment material microscopically, only traces of what might be cuprous oxide appear. It would therefore seem that in the pigmented material the cuprous oxide is colloidally dispersed throughout the grains of the pigment. This colloidally dispersed form of cuprous oxide appears to be responsible for the intense color which is characteristic of the composite copper succinate pigment, since the color is destroyed and a gray product, that does not show the X-ray photogram of cuprous oxide but instead that of metallic copper, is formed by subjecting the pigment to a stream of hydrogen gas at temperatures of 450° F. The metallic copper formed in the reduced product accounted for only a part of the cuprous oxide of the pigment.

The above example is illustrative and many variations may, of course, be made in the process, depending upon the particular conditions available and the product desired. For example, it is preferred to use saturated solutions and anhydrous substances in order to keep the ingredients in the most concentrated form, thus assuring a rapid precipitation and a resultant finer precipitate. More dilute solutions may, however, be used.

In the example given, the ingredients were mixed in the proportions of about 1 mol of succinic acid to 1.5 mols of sodium carbonate and 1.5 mols of copper sulfate. This provided an excess of about 50% of sodium carbonate over that theoretically required to neutralize the succinic acid, and the amount of copper sulfate theoretically required to combine with all the succinic acid and the excess of sodium carbonate. An excess of copper sulfate over this amount is of no particular advantage and will result in loss of copper or require further treatment to recover it. The quantity of sodium carbonate may be varied. For example, 20 to 150% by weight of sodium carbonate in excess of that required to neutralize the succinic acid may be used. However, it is preferred to use an excess of about 50%, since the characteristics of the product improve as the excess sodium carbonate approaches 50% from either above or below that amount. Larger amounts of carbonate give a product of less desirable color, while smaller amounts result in a product having lower color strength. If such or other characteristics are not objectionable in the product, the invention may be used with other proportions. For example, if the proportions of the ingredients are altered so that 75% of excess carbonate is used instead of 50% as in the above example, a product is obtained after heating at 470° which corresponds with the stoichiometric formula $$CuC_4H_4O_4 + .260 CuO + .355 Cu_2O$$

This product, examined microscopically, contains clearly visible grains of cuprous oxide in considerable amounts. The X-ray photogram of this product shows stronger and sharper lines of cuprous oxide and the pigment properties of the product are greatly inferior to those of that which is made with an excess of sodium carbonate of only about 50%. The grain size is coarser and the color a decided olive instead of the clean green tone of the previous example.

In any event, the amount of copper sulfate should be at least that required to react with all the succinic acid and the excess sodium carbonate.

Other alkaline reacting carbonates may be used in place of the sodium carbonate to neutralize the succinic acid. For example, the bicarbonate could be used in place of the carbonate, in which event more carbon dioxide would be liberated. Also, carbonates or bicarbonates of other alkali metals may be used in place of sodium. For instance, carbonates of potassium, lithium, caesium, etc. could be used, their relative usefulness depending upon the cost and the solubility of the carbonates. The ammonium carbonates are not suitable, since complex copper ammonium salts would be formed.

Also, if desired, instead of neutralizing succinic acid or anhydride to form the sodium succinate, the sodium succinate may be used directly and an amount of sodium carbonate added to give the desired proportions of excess, for example, ½ mol of sodium carbonate to 1 mol of sodium succinate. If desired, the basic copper-succinate-carbonate may also be prepared in a different manner and be subsequently heated to form the green pigment as described.

The copper may also be supplied in the form of other water soluble copper compounds, such, for example, as copper nitrate.

The conditions of precipitation should be such as to favor the coprecipitation of the copper succinate and the copper carbonate. Those conditions which are suitable for each of the precipitates to form by itself are preferred for the coprecipitation. It is also desirable to obtain grains as small as possible and to avoid conditions that would result in large grains. Thus it is preferred to precipitate under conditions that will result in sudden crystallization, such, for example, as in concentrated solutions, at low temperature and with rapidity of mixing.

In the precipitation of the cupric succinate-carbonate, the temperature of the solution should not exceed 200° F. and should preferably be kept lower. Raising the temperature to the boiling point results in a rapid change to a blue compound with evolution of carbon dioxide. It is preferred to keep the solutions close to room temperature, since lower temperatures favor a finer average particle size of the precipitated material. Even lower temperatures may be used to advantage if commercially practicable.

It is also important that the subsequent drying of the precipitate be carried out at temperatures below those at which the copper carbonate and succinate will hydrolyze. It is desirable not to heat the precipitate while drying to over 200° F.

and preferably to temperatures of about 150° F. Too high temperatures of the wet precipitate result in hydrolysis accompanied by loss of carbon dioxide and change in color from blue-green toward blue. The blue material when processed at 470° F. in an inert atmosphere produces a pigment of less desirable color and of low tinting strength. This change from the blue-green to the blue compound occurs only in the presence of moisture at elevated temperatures. After the product has been thoroughly dried, the temperature may be raised without any change to the blue material. In some instances the use of vacuum or a current of gas through or over the solution may be desirable to accomplish the drying at low temperatures or more rapidly.

The heating of the precipitate after drying should be under carefully controlled conditions. An inert or non-oxidizing and non-reducing atmosphere, such as in the presence of nitrogen or carbon dioxide, should be used. In the presence of air or oxygen in substantial amounts, the product is discolored to an olive or brown shade and, in the presence of an external reducing atmosphere, such as in a stream of hydrogen, the cuprous oxide is reduced and a bluish gray product formed.

The control of temperature during this step is also important. If the temperature to which the material is exposed is above 500° F., decomposition of the product is very noticeable in a short time, resulting in loss of color. At temperatures between 470 and 500° F., some decomposition takes place, depending on the time of heating at that temperature, and the desirability of operating at such temperatures will depend upon the purity of color required and the time available. Below 460° F., the change to the intensely green color is not complete in a reasonable time and many hours will be required for the reaction. It is preferred to operate at temperatures of 465 to 475° F., at which temperature about one to two hours will be required for the reaction. This time is, of course, dependent upon the degree of agitation, and more rapid agitation will hasten the process. The temperatures referred to in discussing this heating step are temperatures of the surrounding medium. The actual temperature of the material will depend on the time of exposure, degree of agitation and the heat conductivity of the material and should be sufficient to liberate the carbon dioxide and water present in the precipitate but insufficient to decompose the resultant anhydrous product. Cupric succinate-carbonate insufficiently heated does not develop its fullest tinting strength. It slowly absorbs moisture from a damp atmosphere, and after a period of time partly reverts to the blue-green color of low intensity, which it had before heat treatment. Completion of the reaction at 470° F. or higher to form the irreversible compound is easily noted by no further evolution of water vapor and carbon dioxide. The reaction is assisted somewhat by agitating the solid during heating.

The presence of cuprous oxide in the product obtained by heat treating the copper succinate-carbonate, and salts of similar organic acids, is essential to the obtaining of a product of high color intensity. However, a substantial excess of the cuprous oxide over that of the example given above may actually reduce the intensity of color of the product. For example, a product obtained by adding at room temperature a substantially saturated solution containing 159 grams of copper sulfate crystals to another substantially saturated solution containing 68 grams of sodium carbonate, 50 grams of succinic acid and 20 grams of anhydrous sodium sulfite and washing, drying and heating the precipitate at 470° F. for the required length of time, gave a product containing 43.55% cupric oxide, 11.27% cuprous oxide and 45.18% succinic anhydride (by difference). This material, although containing more cuprous oxide than the previously prepared basic copper succinates, did not have higher tinting strength, but instead had somewhat lower intensity of color.

The presence of the carbonate in the precipitate is essential in producing the desired product. For example, if sodium hydroxide is used to neutralize the acid in place of the alkali carbonate, the same results are not obtained.

In the preferred operations, a coprecipitated mixture of cupric succinate and cupric carbonate is precipitated and dried at temperatures below about 200° F. and heated to a temperature of not less than about 470° F. and not over about 500° F. until cessation of carbon dioxide indicates that all of the carbonate has been changed. A very fine and intensely colored green pigment is obtained similar in color to medium chrome green. The coprecipitated mixture is referred to herein as cupric succinate-carbonate. It is stable in the presence of moisture at temperatures below 200° F. Above that temperature, hydrolysis occurs in which part or all of the carbonate is hydrolyzed to hydroxide, producing a blue substance from the original, which is blue-green. In carrying out our process, we attempt to avoid the formation of this blue material by holding the temperature below that point at which electrolysis occurs both during the precipitation and the drying operations. The dry cupric succinate-carbonate may then be converted into the final product by heat treatment, as described above. The development of high color intensity appears to be associated with the production of the cuprous ingredient by self reduction of the cupric copper.

The invention may also be used in the preparation of copper pigments of other organic polybasic acids containing a paraffinic chain of at least two carbon atoms between adjacent carboxyl groups. Dibasic acids, or their salts, are especially useful for this purpose, although other polybasic acids, or their salts, may also be used where they contain the completely saturated group with at least two carbon atoms between two adjacent carboxyl groups. Saturated aliphatic dibasic acids containing 2, 4, 6 and 8 carbon atoms between the carboxyl groups are preferred. For example, satisfactory results may be obtained in using adipic acid or sebacic acid.

The behavior of these acids is similar to that of succinic acid. However, the copper-adipate-carbonate and copper-sebacate-carbonate are more easily decomposed in the presence of moisture. Thus, even on standing at room temperature, a slow evolution of carbon dioxide and change to a blue compound occur. If the conditions set forth for the succinic acid compound are used, the product obtained by heating to 470° F. in an inert atmosphere is not of as good a color and has only about 25% of the tinting strength of the copper succinate. In using the adipic and sebacic acids, it is preferred to use the carbonate in proportions of 100% excess of carbonate over that theoretically required. Also, lower temperatures are desirable in the precipitation and drying of the precipitate. For example, with adipic and sebacic acids it is desirable to precipitate and dry at room temperature or less, thus avoiding the temperatures in the presence of uncombined water that would cause hydrolysis. After drying, the precipitate may then be heated to about 470° F. until the compound reaches the irreversible stage.

It is apparent that many other variations may be made in using the invention and it is not intended to limit it to the particular details of procedure given in the illustrative examples. Although preferred conditions have been referred to, the invention may also be used to a lesser degree of advantage by following other conditions. For example, higher temperatures than those specified may be applied for short periods, the harmful effect being dependent on the time of application of the temperature and the characteristics required in the product. Somewhat lower temperatures than those specified may be used if the longer times required are not objectionable. Also, in certain uses of the invention, other conditions than those here set forth may be preferred. The terms used in describing the invention have been used in their descriptive sense and not as terms of limitation and it is intended to include all equivalents of the terms used within the scope of the appended claims. For example, in using the term "acid" in the appended claims, it is intended to include the anhydride of the acid.

We claim:

1. A method for preparing a copper pigment composition comprising reacting a solution containing a water soluble alkali metal carbonate and an alkali metal salt of an organic aliphatic polybasic acid having a completely saturated group of at least two carbon atoms between two of the carboxyl groups of the acid with an inorganic soluble cupric salt and heating the resulting precipitate to a temperature between 460° and 500° F. to liberate carbon dioxide and water.

2. A method of preparing a copper pigment composition comprising reacting a solution containing a water soluble alkali metal carbonate and an alkali metal salt of an organic aliphatic dibasic acid having a paraffinic chain of at least two carbon atoms between the carboxyl groups of the acid with an inorganic soluble cupric salt and heating the resulting precipitate at a temperature between 460° and 500° F. to liberate carbon dioxide and water.

3. A method for preparing a copper pigment composition comprising reacting a solution containing a water soluble alkali metal carbonate and an alkali metal salt of an organic aliphatic dibasic acid having a paraffinic chain of at least two carbon atoms between the carboxyl groups of the acid with an inorganic soluble cupric salt and heating the resulting precipitate at a temperature between 465° to 475° F. to liberate carbon dioxide and water.

4. A method of preparing a copper pigment composition comprising reacting a solution containing an alkali metal carbonate and an alkali metal salt of an organic dibasic aliphatic acid having a completely saturated group of at least two carbon atoms between the carboxyl groups with an inorganic soluble cupric salt, drying the precipitate at a temperature not substantially over 200° F. and heating the resulting product at a temperature between 460° and 500° F. to liberate carbon dioxide and water.

5. A method of preparing a copper pigment comprising reacting an alkali metal carbonate with a dibasic aliphatic organic acid having a completely saturated chain of at least two carbon atoms between the carboxyl groups, the amount of alkali metal carbonate employed being in the proportion of about 20 to 150% in excess of that required to neutralize said organic acid, reacting the resulting product with an inorganic soluble cupric salt, separating and drying the precipitate at a temperature not substantially over 200° F. and thereafter heating the dried precipitate to between 460° and 500° F. to liberate carbon dioxide and water.

6. A method of preparing a copper pigment composition comprising reacting a solution containing an alkali metal carbonate and an alkali metal succinate with a solution of copper sulfate and heating the resulting precipitate at a temperature between 460° and 500° F. in a substantially non-oxidizing and non-reducing atmosphere to liberate carbon dioxide and water.

7. A method of preparing a copper pigment composition comprising reacting a solution containing an alkali metal carbonate and an alkali metal adipate with a solution of copper sulfate and heating the resulting precipitate at a temperature between 460° and 500° F. in a substantially non-oxidizing and non-reducing atmosphere to liberate carbon dioxide and water.

8. A method of preparing a copper pigment composition comprising reacting a solution containing an alkali metal carbonate and an alkali metal sebacate with a solution of copper sulfate and heating the resulting precipitate at a temperature between 460° and 500° F. in a substantially non-oxidizing and non-reducing atmosphere to liberate carbon dioxide and water.

9. As a new article of manufacture, a copper pigment identical with that prepared by the method comprising reacting a solution containing a water soluble alkali metal carbonate and an alkali metal salt of an organic aliphatic polybasic acid having a completely saturated group of at least two carbon atoms between two of the carboxyl groups of the acid with an inorganic soluble cupric salt and heating the resulting precipitate between 460° and 500° F. to liberate carbon dioxide and water.

10. As a new article of manufacture, a coppei pigment identical with that prepared by the method comprising reacting a solution containing a water soluble alkali metal carbonate and an alkali metal salt of an organic aliphatic dibasic acid having a paraffinic chain of at least two carbon atoms between the carboxyl groups of the acid with an inorganic soluble cupric salt and heating the resulting precipitate between 465° and 475° F. to liberate carbon dioxide and water.

11. As a new article of manufacture, a copper pigment identical with that prepared by the method comprising reacting an alkali metal carbonate with an organic aliphatic dibasic acid having a paraffinic chain of at least two carbon atoms between the carboxyl group of the acid, the proportion of said alkali metal carbonate being about 20 to 150% in excess of that required to neutralize said organic acid reacting the resulting product with an inorganic soluble cupric salt, heating the resulting precipitate between 465° and 475° F. in a non-oxidizing and non-reducing atmosphere to liberate carbon dioxide and water.

12. As a new article of manufacture, a copper pigment identical with that prepared by the method comprising reacting an alkali metal carbonate with an organic aliphatic dibasic acid having a completely saturated group of at least two carbon atoms between the carboxyl groups of the acid, said alkali metal carbonate being in the proportion of about 50% excess of that theoretically required to neutralize said acid, reacting the resulting product with a solution of copper sulfate, separating and drying the resulting precipitate at not substantially over 200° F. and thereafter heating the dried precipitate at a temperature between 465° to 475° F. in a non-oxidizing and non-reducing atmosphere to liberate carbon dioxide and water.

13. As an article of manufacture, a copper pigment identical with that prepared by the method comprising reacting sodium carbonate with succinic acid in the proportion of about 50% excess of sodium carbonate over that theoretically required to neutralize succinic acid, reacting the resulting product with copper sulfate in the ratio of at least one part of copper sulfate to that of the sodium carbonate employed, separating and drying the resulting precipitate at not substantially over 200° F., and thereafter heating the dried precipitate at about 465° to 475° F. in a non-oxidizing and non-reducing atmosphere to liberate carbon dioxide and water.

14. As an article of manufacture, a copper pigment identical with that prepared by the method comprising reacting sodium carbonate with adipic acid in the proportion of about 50% excess of sodium carbonate over that theoretically required to neutralize adipic acid, reacting the resulting product with copper sulfate in the ratio of at least one part of copper sulfate to that of the sodium carbonate employed, separating and drying the resulting precipitate at not substantially over 200° F., and thereafter heating the dried precipitate at about 465° to 475° F., in a non-oxidizing and non-reducing atmosphere to liberate carbon dioxide and water.

15. As an article of manufacture, a copper pigment identical with that prepared by the method comprising reacting sodium carbonate with sebacic acid in the proportion of about 50% excess of sodium carbonate over that theoretically required to neutralize sebacic acid, reacting the resulting product with copper sulfate in the ratio of at least one part of copper sulfate to that of the sodium carbonate employed, separating and drying the resulting precipitate at not substantially over 200° F., and thereafter heating the dried precipitate at about 465° to 475° F. in a non-oxidizing and non-reducing atmosphere to liberate the carbon dioxide and water.

SIDNEY B. TUWINER.
DWIGHT A. DODGE.